United States Patent [19]

Yamada et al.

[11] Patent Number: 5,017,358

[45] Date of Patent: May 21, 1991

[54] PREPARATION OF ELASTIC GRAPHITE MATERIALS

[75] Inventors: Yasuhiro Yamada, Tosu; Masaki Fujii, Sakai; Seiji Shimomura, Chikushino, all of Japan

[73] Assignees: Dir. General, Agency of Industrial Science and Technology; Koa Oil Company, Ltd., both of Tokyo, Japan

[21] Appl. No.: 407,642

[22] Filed: Sep. 15, 1989

[30] Foreign Application Priority Data

Sep. 22, 1988 [JP] Japan .................................. 63-237921

[51] Int. Cl.$^5$ ............................................. C01B 31/04
[52] U.S. Cl. .................................... 423/449; 264/29.1; 264/29.7; 423/448; 423/460
[58] Field of Search ...................... 423/448, 449, 460; 264/29.1, 29.7

[56] References Cited

U.S. PATENT DOCUMENTS

| | | | |
|---|---|---|---|
| 3,431,970 | 3/1969 | Olstowski et al. | 423/460 |
| 4,873,071 | 10/1989 | Yamada et al. | 264/29.1 |
| 4,895,713 | 1/1990 | Greinke et al. | 423/448 |
| 4,908,200 | 3/1990 | Fujii et al. | 423/449 |

FOREIGN PATENT DOCUMENTS

| | | | |
|---|---|---|---|
| 0069413 | 4/1984 | Japan | 423/448 |
| 0071507 | 4/1985 | Japan | 423/448 |
| 0139011 | 6/1988 | Japan | 423/448 |
| 0201736 | 8/1988 | Japan . | |
| 1197008 | 7/1970 | United Kingdom | 423/448 |

*Primary Examiner*—Gary P. Straub
*Assistant Examiner*—Stephen G. Kalinchak
*Attorney, Agent, or Firm*—Wenderoth, Lind & Ponack

[57] ABSTRACT

A method for producing an elastic graphite material having a packing density of 1.0 g/cm$^3$ or lower and a recovery of 50% or higher at a compressibility of 10 to 90% is provided, which comprises: heating a carbonaceous material rapidly while bringing the carbonaceous material into contact with nitric acid for expansion and foaming, and graphitizing the thus expanded and foamed carbonaceous material.

5 Claims, No Drawings

PREPARATION OF ELASTIC GRAPHITE MATERIALS

BACKGROUND OF THE INVENTION

The present invention relates to a carbon material and, more particularly, to a method for preparing a granular graphite material which is of light weight, is heat resistant and excels in elasticity.

In general, carbon materials have such properties as not found in other materials, as typically expressed in terms of light weight, heat resistance and high elasticity. They are rigid in block form, even though they are porous, whereas they are deformable in fine or thin form, e.g., in fiber, sheet or film form. However, such carbon materials do not have the property of being elastic in themselves. As carbon material of elasticity, there have heretofore been known sheets prepared from expanded graphite. However, their elastic recovery is low, as measured when compression load is applied and thereafter removed. (See Saito "Industrial Materials", Vol. 29, page 34, 1985).

The present inventors have already provided a method for preparing granular elastic graphite materials having an increased elastic recovery, as determined when compression load is applied and thereafter removed (Japanese Patent Laid-Open Publication Nos. 13908/1988 and 9808/1989). According to the methods disclosed therein, a carbonaceous mesophase or raw coke treated with nitric acid or a mixed acid of nitric acid with sulfuric acid (as described in Japanese Patent Laid-Open Publication No. 285493/1986) or a carbonaceous mesophase or raw coke treated with nitric acid or a mixed acid of nitric acid with sulfuric acid (as disclosed in Japanese Patent Laid-Open Publication No. 9808/1989) is dissolved in an aqueous alkaline solution and precipitated in an aqueous acid solution to obtain an aqua-mesophase, which is in turn treated by heating at about 300° C. for expansion and foaming and then graphitized at a temperature of 2400° C. or higher. It is true that the graphite materials obtained by such methods have excellent elastic recoveries, but it is required that, in the former method, after treated with nitric acid or a mixed acid of nitric acid with sulfuric acid or with nitric acid or a mixed acid of nitric acid with sulfuric acid in the latter method, the thus acid treated material be further treated for dissolution and precipitation. The treatment with nitric acid or a mixed acid of nitric acid with sulfuric acid, common to both methods, is carried out to simultaneously introduce into the starting material a nitro group and a carboxylic acid group and a hydroxyl group, both formed by oxidation that is a side reaction. From this, it is presumed that the expansion and foaming phenomena occurring during the heat treatment at about 300° C. are brought about by the melting of the raw material by the nitro group and gases generated due to the decomposition of the carboxylic acid and hydroxyl groups. In other words, it appears that the presence of the nitro group, carboxylic acid and the like are an inevitable requirement for such methods.

In any case, such conventional methods as mentioned above involve relatively sophisticated steps and operations and are thus time consuming.

SUMMARY OF THE INVENTION

An object of the present invention is to provide a method for preparing graphite materials having improved elastic properties, which makes it possible to carry out the steps applied in the prior art method in a more reasonable and faster manner, thereby simplifying the manufacturing steps and cutting down the cost of production.

As mentioned above, the conventional manufacturing methods comprise a series of the treatment with nitric acid or a mixed acid of nitric acid with sulfuric acid, solubilization and precipitation, expansion/foaming and graphitization. According to the studies of the present inventors, however, it has now been found that if the starting carbonaceous material is rapidly heated while bringing it into contact with nitric acid, it can then be expanded and foamed at a substantially single step and graphitized, thereby obtaining an elastic graphite material having improved properties.

The method of preparing elastic graphite materials according to the present invention has been accomplished on the basis of the above findings and, more specifically, is characterized in that a carbonaceous material is rapidly heated while bringing the carbonaceous material into contact with nitric acid for expansion and foaming, and the thus expanded and foamed carbonaceous material is then graphitized, as will be explained in detail.

DETAILED DESCRIPTION OF THE PREFERRED EMBODIMENTS

Carbonaceous Materials

Preferably used as the starting carbonaceous materials are a carbonaceous mesophase and/or coke. The carbonaceous mesophase is an optically anisotropic material formed when a heavy bituminous material is heat-treated at about 350° to 500° C., and is a component insoluble in an organic solvent. In addition, the materials to be used should have a hydrogen content of 2% by weight or higher. The heavy bituminous materials used as such carbonaceous materials may be coal base pitches such as liquefied coal and coal tar pitch; petroleum base pitches such as naphtha tar pitch formed as a by-product in the thermal cracking of oily residues from the distillation of petroleum and naphtha and FCC decant oil formed as a by-product in the fluid catalytic cracking of naphtha, etc.; pitches obtained by the thermal decomposition of synthetic polymers such as PVC; and so on. No limitation is imposed upon the type of the heavy carbonaceous materials used, provided that they are capable of providing easily graphitizable carbon by carbonization. Such pitches are heat-treated at about 350° to 500° C., thereby forming a carbonaceous mesophase. The formation of the carbonaceous mesophase is easily detectable by observation under a polarized-light microscope. That is, the carbonaceous mesophase is discernible as an optically anisotropic phase in the pitch that is an optically isotropic phase.

The heat-treatment conditions under which the carbonaceous mesophase is to be formed are determined by the elemental analysis of the carbonaceous mesophase separated from the pitch. Of the elements, hydrogen in particular should preferably be contained in an amount of 2% by weight or higher.

Semi-coke obtained by the total solidification of pitches under severe heat-treatment conditions has a hydrogen content lower than 2%, and is thus not substantially increased in volume even by heat treatment, after the mixed acid treatment. For that reason, any excessive heat treatment has to be avoided.

The carbonaceous mesophase may be separated from the heat-treated pitch by sedimentation or/and fractionation-by-solvent. More specifically, when the heat-treated pitch is kept stationary in its molten state, the carbonaceous mesophase settles down and is thus collectable. On the other hand, when the heat-treated pitch is dissolved and dispersed in a solvent such an organic solvent, e.g., quinoline or pyridine or an aromatic oil containing a larger amount of aromatic compounds, e.g., anthracene oil or creosote oil, it can be obtained as a component insoluble in such solvents.

The thus separated carbonaceous mesophase is in powdery or bulky form, but it is not preferable to use them as such. This is because when the mesophase has as large a particle size several mm or above, its reaction with nitric acid becomes so insufficient, giving rise to the fear that the degrees of its expansion and foaming may drop, since the length of time for treating it with nitric acid is relatively short. At a particle size of about 50 μm or lower, on the other hand, the degrees of expansion and foaming are not preferable with deteriorations of the performance of the obtained elastic material. Hence, a particle size range of about 1–2 mm to 100 μm is preferable.

Expansion and Foaming

In the present invention, such a carbonaceous mesophase as mentioned above is rapidly heated while being brought into contact with nitric acid, thereby expanding and foaming it, as will typically be explained below.

Nitric acid at a concentration of 30 to 70% is added in an amount of 0.5 ml or more to 1 g of the above carbonaceous mesophase, which is then placed in a furnace pre-heated to 200 to 400° C. and held therein for preferably 2 minutes or longer, or more preferably 10 minutes or longer. The concentration of nitric acid used should preferably be 30% or higher, as mentioned above. A concentration of lower than 30% is not preferred, since the degrees of expansion and foaming of the carbonaceous mesophase are then reduced. An amount of nitric acid less than 0.5 ml is again not preferred since the reaction of the carbonaceous mesophase therewith then proceeds so unsatisfactorily that its expansion and foaming degrees are reduced.

During such heat treatment of the carbonaceous mesophase and nitric acid as mentioned above, the following phenomena take place. That is, when nitric acid is added to the carbonaceous mesophase put in a vessel, a slight amount of a brown gas is emitted. With the vessel placed in the pre-heated furnace, a large amount of brown gas is generated, following which a white gas taken as being water vapor is emitted with its amount being gradually decreased. Afterwards, a white gas is abruptly generated, and the reaction is brought to completion when such a white gas disappears. It is when the white gas is emitted that the carbonaceous mesophase is expanded and foamed. The length of time from putting a sample vessel in the furnace to the termination of emission of the gas is usually about 3 to 4 minutes at a heat-treatment temperature of 300° C., although it varies depending upon the concentration and amount of nitric acid used and the heat-treatment temperature applied. After the emission of the gas comes to an end, no noticeable influence is exerted upon the properties of the obtained elastic graphite material, even when the mesophase is retained over a further extended period of time. The thus expanded and foamed carbonaceous mesophase may be obtained in a dried state. Geometrical changes are primarily determined by such treatment and subsequently maintained after graphitization.

In order to carry out the manufacturing process in a more reasonable and faster manner as mentioned above, to thereby obtain an elastic graphite material at reduced costs of production, it is preferable to rapidly heat the carbonaceous mesophase at a temperature of 200° to 400° C., while bringing it into contact with nitric acid. A heat-treatment temperature lower than 200° C. is not preferable, since the length of time required for the reaction involved is then so increased that any fast manufacturing process is not achievable. A heat-treatment temperature higher than 400° C. is again unpreferred since, before the reaction of nitric acid with the carbonaceous mesophase occurs, nitric acid is decomposed into a nitrogen oxide gas, which is in turn discharged from within the system. At a gradual heating rate, i.e., a low rate of temperature rise, nitric acid is decomposed into a nitrogen oxide gas before the reaction involved is attained, and is then discharged from within the system. It is thus of vital importance for heating to apply as fast a temperature rise as possible.

It is desired that graphitization be usually carried out at a temperature of 2000° C. or higher. This is because products obtained at a lower temperature are found to show only a limited recovery-after-compression, as will be described later. The treatment at any temperature of 2000° C. or higher results in an increase in the recovery.

Whether or not the thus obtained product is an elastic material may be confirmed by the following test.

About 1 g of the obtained sample is put in a cylindrical mold made of stainless and of 10 mm in inner diameter, and the mold is then struck to achieve the closest packing. Afterwards, a push rod is inserted from above to apply a load of 100 g, under which the height $h_o$ of the sample is then measured. Subsequently, the height $h_1$ of the sample is found under a given load further applied. After the removal of the second load, the height $h_2$ of the sample is measured. From these values for height, the packing density, compressibility and recovery can be found by the following equations.

Packing Density (g/cm$^3$) = Weight of Sample in g/($h_o \pi r^2$)   (1)

Compressibility (%) = $[(h_o - h_1)/h_o] \times 100$   (2)

Recovery (%) = $[(h_2 - h_1)/(h_o - h_1)] \times 100$   (3)

According to the method of the present invention, it is possible to obtain an elastic graphite material having a packing density of 1.0 g/cm$^3$ or less, as found by Equation (1) and a recovery of 50% or higher at a compressibility of 10 to 90% as defined by Equation (2).

The method of the present invention will now be explained in further detail with reference to the following examples.

EXAMPLE 1

About 1500 ml of quinoline were added to 500 g of coal tar pitch, which was then heated to about 90° C. for dissolution. The insoluble component was allowed to settle down in a centrifugal settling machine, and the supernatant liquid was filtrated under reduced pressure through a qualitative filter paper. The filtrate was distilled under reduced pressure for the removal of quinoline, thereby obtaining a pitch containing no free carbon. Put in a 500-ml cylindrical vessel made of glass were 300 g of the pitch, which was in turn heated with stirring to 450° C. under a nitrogen gas flow and held at that temperature for 45 minutes. Just after the lapse of given time, the vessel is cooled down to room temperature to obtain 273 g of the heat-treated pitch. Added to 200 g of the heat-treated pitch were 600 ml of quinoline, followed by heating to about 90° C. at which the pitch was dissolved and dispersed in quinoline. The insoluble component was permitted to settle down in a centrifugal settling machine, followed by the removal of the supernatant liquid. Fresh quinoline was added to the insoluble component, followed by heating to about 90° C. Thereafter, the insoluble component was allowed to settle down in a centrifugal settling machine. After this operation was repeated five times, the insoluble component was thoroughly washed with benzene and then acetone to remove quinoline, and was dried at about 70° C to obtain 98 g of a carbonaceous mesophase. Then, 50 g of the carbonaceous mesophase were put in 200 g of quinoline, heated to about 250° C. and held at that temperature under quinoline reflux for 3 hours. Afterwards, the insoluble component was allowed to settle down in a centrifugal settling machine to remove the supernatant liquid. After this operation was repeated eight times, the insoluble component was well-washed with benzene and then acetone to remove quinoline, and dried at about 70° C. to obtain 44 g of a carbonaceous mesophase.

Of the carbonaceous mesophases prepared in this called (A) and that by the latter method (B), with the properties set forth in Table 1.

TABLE 1

| Carbonaceous Mesophase | Elemental Analysis (% by weight) | | |
|---|---|---|---|
| | C | H | N |
| (A) | 93.1 | 3.6 | 1.8 |
| (B) | 92.1 | 3.4 | 1.4 |

Five (5) g of the mesophase (A) regulated to a particle size of 0.25 to 0.5 mm were put in a glass-made cylindrical flask of 300 ml in volume with the addition of 10 ml of 70% concentrated nitric acid. Just after a lid provided with an outlet had been put on, the flask was placed in a furnace heated to 300° C. After it had been retained in this state for 10 minutes, the flask was removed from within the furnace and cooled down. The thus treated product was obtained in an amount of 4.01 g, i.e., in a yield of 80.2% by weight. This was placed in a graphite crucible, which was then heated to 2800° C. in a Tammann furnace under an argon flow and held at that temperature for 60 minutes for graphitization. The graphitized product was obtained in an amount of 3.59 g, i.e., a yield of 71.7% by weight with respect to the carbonaceous mesophase.

Placed in a stainless-made cylindrical mold of 10 mm in inner diameter were 1.3 g of the graphitized product, which was measured in terms of its height ($h_o$) under a load of 100 g. From this, the packing density was found to be 0.59 g/cm$^3$, as calculated according to Equation (1). Then, the height ($h_1$) of the sample was measured under a load of 630 Kg/cm$^2$. After the removal of the second load, the sample was again measured in terms of its height ($h_2$). The compressibility and recovery were 72% and 72%, respectively, as found from the obtained $h_1$ and $h_2$ by Equations (2) and (3).

The above carbonaceous mesophase (A) and the carbonaceous mesophase (B) regulated to a particle size of 0.25 to 0.5 mm were used at varied concentrations and amounts of nitric acid, heat-treatment temperatures and graphitization temperatures. The resulting yields are set forth in Table 2, while the resulting packing densities, rates of compression and recoveries are shown in Table 3.

TABLE 2

| Experimental No. | Nitric Acid | | Heat Treatment | | | Graphitization | |
|---|---|---|---|---|---|---|---|
| | Conc. (%) | Amount (ml) | Temp. (°C.) | Time (min) | Yield (wt %) | Temp. (°C.) | Yield (wt %) |
| Carbonaceous Mesophase (A) | | | | | | | |
| 2 | 70 | 30 | 300 | 10 | 84.4 | 2800 | 70.6 |
| 3 | 70 | 30 | 300 | 10 | 84.4 | 2100 | 77.2 |
| 4 | 40 | 30 | 300 | 10 | 91.7 | 2700 | 73.1 |
| 5 | 70 | 30 | 200 | 45 | 77.9 | 2700 | 71.6 |
| Carbonaceous Mesophase (B) | | | | | | | |
| 6 | 70 | 30 | 300 | 10 | 95.1 | 2800 | 75.1 |
| 7 | 70 | 30 | 300 | 10 | 95.1 | 2100 | 79.2 |
| Comp. Ex. | 70 | 30 | 300 | 10 | 95.1 | 1900 | 80.6 |
| 8 | 40 | 30 | 300 | 10 | 96.6 | 2800 | 76.4 |
| 9 | 70 | 10 | 400 | 10 | 85.1 | 2800 | 73.2 |
| 10 | 70 | 30 | 200 | 45 | 95.6 | 2700 | 74.6 |

TABLE 3

| Experimental No. | Packing Density (g/cm$^3$) | Load (Kg/cm$^2$) | Compressibility (%) | Recovery (%) |
|---|---|---|---|---|
| 2 | 0.60 | 636 | 70 | 70 |
| 3 | 0.55 | 629 | 70 | 63 |
| 4 | 0.87 | 646 | 61 | 65 |
| 5 | 0.33 | 661 | 84 | 54 |
| 6 | 0.67 | 633 | 63 | 63 |
| 7 | 0.61 | 644 | 64 | 55 |
| Comp. Ex. | 0.68 | 643 | 56 | 42 |
| 8 | 0.84 | 646 | 54 | 60 |
| 9 | 0.74 | 635 | 60 | 60 |
| 10 | 0.60 | 638 | 69 | 66 |

EXAMPLE 2

Placed in a 5-liter vessel were 2 Kg of FCC decant oil from which low boiling components having a boiling point of about 500° C. or lower had been previously removed by distillation under reduced pressure. Under a nitrogen gas flow, the oil was heat-treated with stirring to 500° C. and held at that temperature for 2 hours, after which heating and stirring were stopped to cool off the vessel. Upon the internal temperature reached 400° C., cooling-off was initiated while that temperature was maintained by heating. After the lapse of a total of 3 hours, about 1.6 Kg of a pitchlike product were removed from a discharge hole provided in a lower portion of the vessel. Quinoline was added to the pitchlike product in a two-fold amount, which was then heated to 90° C. for dissolution and dispersion. Then, the insoluble component was separated by means of a centrifugal separator, and fresh quinoline was added thereto, followed by heating and centrifugal separation. After this operation had been repeated five times, the insoluble component was well-washed with benzene and acetone and dried. The insoluble component was obtained in an amount of 1.2 Kg, and was found to show entirely an anisotropic flow texture as observed under a polarized-light microscope. Thus, this insoluble component was used as a carbonaceous mesophase.

The thus prepared carbonaceous mesophase was found to have an elemental analysis of carbon: 93.3% by weight, hydrogen: 3.8% by weight and nitrogen: 0.7% by weight.

The carbonaceous mesophase was pulverized to obtain a raw material having a particle size of 0.25 to 0.5 mm. In a similar manner as described in Example 1, the raw material was heat-treated with nitric acid under various conditions, and was thereafter graphitized. The treatment conditions and yields are summarized in Table 4.

The packing densities, compressibility and recoveries of the graphitized products were measured with similar method and apparatus to those used in Example 1. The results are summarized in Table 5.

tized product was 60.3% by weight with respect to the raw material. The packing density, compressibility and recovery of this graphitized product were measured in a similar manner as described in Example 1. As a result, the packing density was 0.25 g/cm$^3$, the compressibility 52% under a load of 220 Kg/cm$^2$, and the recovery 73%.

COMPARISON EXAMPLE 1

The same sample as used in Example 3 was added with quinoline in a three-fold amount, and was then treated under reflux for 1 hour. Then, the insoluble component was permitted to settle down in a centrifugal settling machine to remove the supernatant liquid. Fresh quinoline was added to the insoluble component, which was in turn heated to about 90° C. and treated in a centrifugal settling machine to allow the insoluble component to settle down, followed by the removal of the supernatant liquid. This operation was repeated until quinoline was slightly colored, followed by benzene- and acetone-washing and drying. The thus obtained product had an elemental analysis of carbon: 94.8% by weight, hydrogen: 1.8% by weight and nitrogen: 1.6% by weight. Five (5) g of this product were heat-treated at 300° C. for 10 minutes with 5 ml of nitric acid at a concentration of 70% in a similar manner as described in Example 1. The yield was 83.8% by weight. Then, graphitization was carried out at 2800° C. for 60 minutes. The yield of the graphitized product was 79.6% by weight with respect to the raw material.

TABLE 4

| Experimental No. | Nitric Acid Conc. (%) | Nitric Acid Amount (ml) | Heat Treatment Temp. (°C.) | Heat Treatment Time (min) | Yield (wt %) | Graphitization Temp. (°C.) | Graphitization Yield (wt %) |
| --- | --- | --- | --- | --- | --- | --- | --- |
| 12 | 70 | 30 | 300 | 10 | 80.9 | 2800 | 58.1 |
| 13 | 70 | 2.5 | 300 | 10 | 88.5 | 2700 | 59.6 |
| 14 | 50 | 5 | 300 | 10 | 85.1 | 2700 | 60.6 |
| 15 | 30 | 30 | 300 | 10 | 83.3 | 2600 | 64.1 |
| 16 | 70 | 30 | 300 | 10 | 80.9 | 2100 | 65.3 |
| Comp. Ex. | 70 | 30 | 300 | 10 | 80.9 | 1900 | 67.1 |
| 17 | 70 | 30 | 200 | 45 | 83.9 | 2700 | 61.1 |
| 18 | 70 | 10 | 400 | 10 | 87.8 | 2800 | 55.7 |

TABLE 5

| Experimental No. | Packing Density (g/cm$^3$) | Load (Kg/cm$^2$) | Compressibility (%) | Recovery (%) |
| --- | --- | --- | --- | --- |
| 12 | 0.40 | 650 | 79 | 79 |
| 13 | 0.84 | 644 | 59 | 69 |
| 14 | 0.96 | 642 | 56 | 87 |
| 15 | 0.65 | 638 | 66 | 84 |
| 16 | 0.46 | 629 | 75 | 75 |
| Comp. Ex. | 0.50 | 638 | 68 | 47 |
| 17 | 0.22 | 505 | 88 | 54 |
| 18 | 0.71 | 460 | 55 | 60 |

EXAMPLE 3

Raw coke obtained by a delayed coker technique was pulverized to 0.35 to 0.15 mm. The elemental analysis of this coke was hydrogen: 91.8% by weight, hydrogen: 3.6% by weight and nitrogen: 1.4% by weight. Five (5) g of the coke were heat-treated at 300° C. for 10 minutes with 5 ml of nitric acid at a concentration of 5% in a similar manner as described in Example 1. The yield was 86.2% by weight. Then, graphitization was carried out at 2800° C for 30 minutes. The yield of the graphi- The packing density, compressibility and recovery of this graphitized product were measured in a similar manner as described in Example 1. As a result, the packing density was 1.32 g/cm$^3$, the compressibility 28% under a load of 630 Kg/cm2, and the recovery 25%.

COMPARISON EXAMPLE 2

The heat-treated pitch containing carbonaceous mesophase used in Example 1 was pulverized to obtain a material having a particle size of 0.25 to 0.5 mm. Five (5) g of this material were heat-treated at 300° C. for 10 minutes with 5 ml of nitric acid at a concentration of 70% in a similar manner as described in Example 1. The yield was 74.9% by weight. Then, graphitization was carried out at 2800° C. for 60 minutes. The yield of the graphitized product was 52.7% by weight with respect to the carbonaceous mesophase. The packing density, compressibility and recovery of this graphitized product were measured in a similar manner as described in Example 1. As a result, the packing density was 0.16 g/cm3, the compressibility 87% under a load of 440 Kg/cm2, and the recovery 38%.

As will be clearly appreciated from the results of the above examples, elastic graphite materials having improved recovery-after-compression and elastic limit can be produced by simple and rapid treatments wherein the carbonaceous materials are treated with nitric acid and graphitized.

We claim:

1. A method for producing an elastic graphite material having a packing density of 1.0 g/cm$^3$ or lower and a recovery of 50% or higher at a compressibility of 10 to 90%, which comprises:

heating a carbonaceous material so rapidly as to elevate the temperature of the carbonaceous material up to 200° to 400° C. over the period of 2 minutes to 45 minutes while brining the carbonaceous material into contact with nitric acid for expansion and foaming, and graphitizing the thus expanded and foamed carbonaceous material.

2. A method as claimed in claim 1, wherein said carbonaceous material comprises a carbonaceous mesophase and/or coke having a hydrogen content of 2% by weight or higher.

3. A method as claimed in claim 1, wherein the concentration of nitric acid to be brought into contact with said carbonaceous material is 30% or higher.

4. A method as claimed in claim 1, wherein the amount of nitric acid to be brought into contact with said carbonaceous material is 0.5 ml or larger per 1 g of said carbonaceous material.

5. A method as claimed in claim 1, wherein the expanded and foamed carbonaceous material obtained by the contact of said carbonaceous material with nitric acid is graphitized at a temperature of 2000° C. or higher.

* * * * *